United States Patent
Shinozaki

(10) Patent No.: US 8,862,846 B2
(45) Date of Patent: Oct. 14, 2014

(54) CONTROL APPARATUS, CONTROL METHOD, AND STORAGE APPARATUS

(75) Inventor: Yoshinari Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 239 days.

(21) Appl. No.: 13/534,150

(22) Filed: Jun. 27, 2012

(65) Prior Publication Data

US 2013/0031321 A1    Jan. 31, 2013

(30) Foreign Application Priority Data

Jul. 29, 2011    (JP) .................................. 2011-166541

(51) Int. Cl.
*G06F 12/16*    (2006.01)
*G06F 11/20*    (2006.01)
*G06F 11/10*    (2006.01)

(52) U.S. Cl.
CPC ........ *G06F 11/2082* (2013.01); *G06F 11/2094* (2013.01); *G06F 11/2064* (2013.01); *G06F 11/1092* (2013.01)
USPC .................................. 711/162; 711/E12.103

(58) Field of Classification Search
CPC ............ G06F 11/1092; G06F 11/2064; G06F 11/2082; G06F 11/2094; G06F 11/1456; G06F 11/2074; G06F 11/2071; G06F 11/1451
USPC .......................................... 711/162, E12.103
See application file for complete search history.

(56) References Cited

U.S. PATENT DOCUMENTS

2009/0113236 A1    4/2009 Kubota et al.

FOREIGN PATENT DOCUMENTS

JP    2009-110303    5/2009

*Primary Examiner* — Yong Choe
(74) *Attorney, Agent, or Firm* — Staas & Halsey LLP

(57) ABSTRACT

A control apparatus includes a processor. The processor determines, upon detecting a read error on a first volume of a storage under a non-equivalent state, a first storage area in which the read error has occurred. The first storage area is included in the first volume. The processor determines whether a write process has been conducted on the first storage area under the non-equivalent state. The processor determines whether a write process has been conducted on a second storage area under the non-equivalent state. The second storage area is included in a second volume of a storage and corresponds to the first storage area. The processor copies data stored in the second storage area to the first storage area when no write process has been conducted on the first storage area and the second storage area under the non-equivalent state.

8 Claims, 16 Drawing Sheets

FIG. 4

| TABLE NUMBER | 1 |
|---|---|
| COPY SOURCE SESSION ID | 0x0001 |
| COPY TYPE | 0x01 |
| STATE | 0x00 |
| PHASE | 0x01 |
| COPY SOURCE LOGICAL VOLUME | 0x0001 |
| COPY DESTINATION LOGICAL VOLUME | 0x0011 |
| COPY SOURCE LOGICAL VOLUME STARTING LBA | 0x00001000 |
| COPY DESTINATION LOGICAL VOLUME STARTING LBA | 0x00004000 |
| COPY SIZE | 0x10000000 |
| INITIAL COPY HEAD OFFSET | 0x04 |
| INITIAL COPY BITMAP COUNT | 0x03 |
| I/O EXTENSION HEAD OFFSET | 0x07 |
| I/O EXTENSION BITMAP COUNT | 0x03 |

FIG. 5

| | 13a |
|---|---|
| FLAG | ... |
| SESSION MANAGEMENT TABLE NUMBER | 1 |
| BITMAP ADDRESS | ... |

CONTROL APPARATUS, CONTROL METHOD, AND STORAGE APPARATUS

CROSS-REFERENCE TO RELATED APPLICATION

This application is based upon and claims the benefit of priority of the prior Japanese Patent Application No. 2011-166541, filed on Jul. 29, 2011, the entire contents of which are incorporated herein by reference.

FIELD

The embodiments discussed herein are related to a control apparatus, a control method, and a storage apparatus.

BACKGROUND

Storage apparatuses that use a plurality of memory devices to store large amounts of data handled by computer systems are widely used. A typical storage apparatus includes one or more disk devices, and a control apparatus that controls the writing and reading of data on the disk devices.

As an example of a method to improve the reliability of data storage of such a storage apparatus, a method is known in which a redundant configuration is established to manage data among multiple disk devices, and when an error occurs in one disk device, data is restored by referring to another disk device.

Japanese Laid-open Patent No. 2009-110303 discloses a related technique.

A technique is known that periodically stops mirror processing on a temporary basis and backs up data stored in disk devices at that time.

For example, a technique is known in which an asynchronous state is established at a certain time for an operation volume and a replica volume synchronized with the operation volume, and the replica volume is backed up to a tape device while the operation volume is still operating.

SUMMARY

According to an aspect of the present invention, provided is a control apparatus for controlling data stored in a first volume of a storage and a second volume of a storage under one of an equivalent state and a non-equivalent state. The control apparatus includes a processor. The processor determines, upon detecting a read error on the first volume under the non-equivalent state, a first storage area in which the read error has occurred. The first storage area is included in the first volume. The processor determines whether a write process has been conducted on the first storage area under the non-equivalent state. The processor determines whether a write process has been conducted on a second storage area under the non-equivalent state. The second storage area is included in the second volume and corresponds to the first storage area. The processor copies data stored in the second storage area to the first storage area when no write process has been conducted on the first storage area and the second storage area under the non-equivalent state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 describes session management information;

FIG. 5 describes bitmap management information;

DESCRIPTION OF EMBODIMENTS

If a bad sector is generated in the operation volume and data with a non-guaranteed value is generated under a state (non-equivalent state) in which the mirror processing is temporarily stopped to conduct the backup of data, the data may be written into the replica volume when the synchronization is restarted. As a result, there is a problem that the reliability of the data stored in the replica volume decreases.

Hereinafter, a first embodiment of a storage apparatus will be described in detail with reference to the drawings.

First Embodiment

Figure 1:
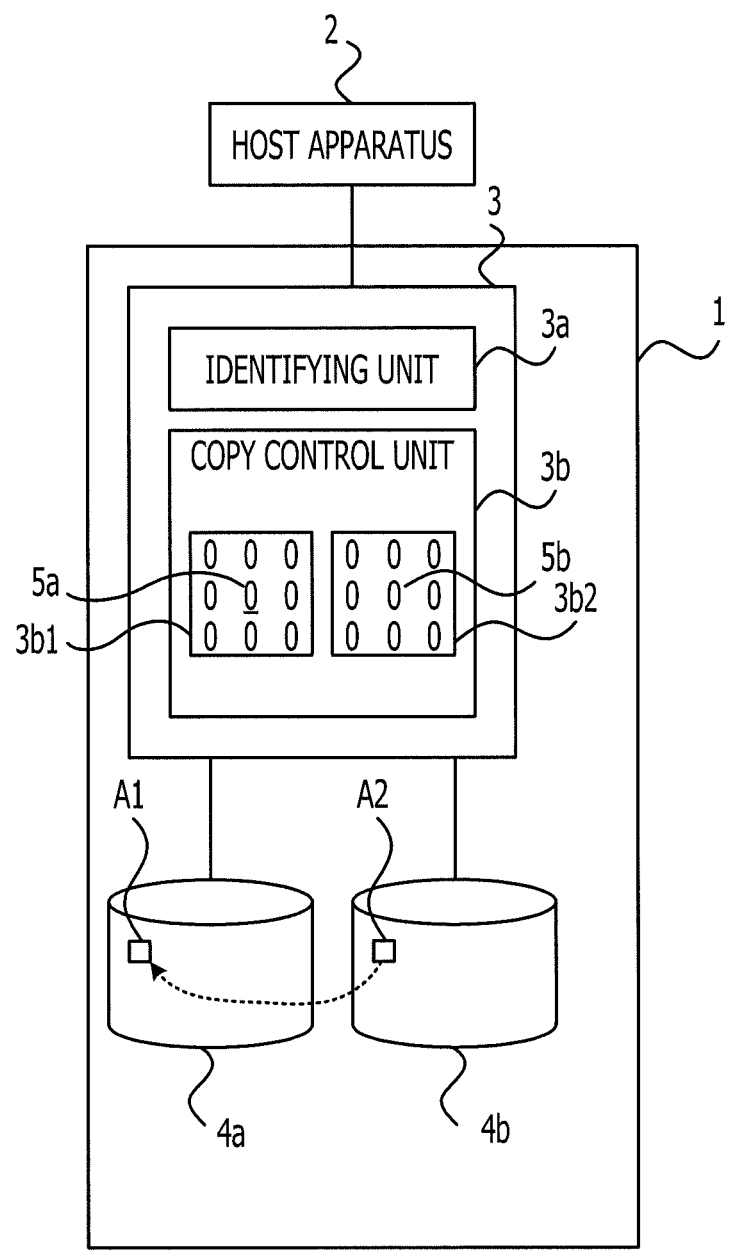
FIG. 1 illustrates a storage apparatus according to a first embodiment.

FIG. 1 illustrates a storage apparatus according to a first embodiment.

A storage apparatus 1 according to the first embodiment is connected to a host apparatus 2 through an electrical communication line, an optical communication line or the like.

The storage apparatus 1 includes a control apparatus (computer) 3, a first volume 4a of a storage, and a second volume 4b of a storage.

The first volume 4a and the second volume 4b include storage regions capable of storing data that is sent from the host apparatus 2. The first volume 4a and the second volume 4b are configured of partial or entire storage regions of one or more hard disk drives (HDDs), solid state drives (SSDs), or the like.

The control apparatus 3 includes an identifying unit 3a and a copy control unit 3b. The functions of the identifying unit 3a and the copy control unit 3b may be realized by a central processing unit (CPU) (not illustrated) included in the control apparatus 3.

The copy control unit 3b controls the first volume 4a and the second volume 4b as to be under an equivalent state or under a non-equivalent state. Under the equivalent state, data stored in the first volume 4a and the second volume 4b is held in a redundant state. Under the non-equivalent state, the second volume 4b is isolated by breaking the redundant state of the first volume 4a and the second volume 4b. Specifically, the copy control unit 3b holds the data stored in the first volume 4a and the second volume 4b to be equivalent by synchronizing the first volume 4a and the second volume 4b. The copy control unit 3b switches the state of the data to be non-equivalent by stopping the synchronization of the first volume 4a and the second volume 4b in order to isolate the second volume 4b when starting the backup of the second volume 4b. Immediately after switching to the non-equivalent state, the data stored in the second volume 4b is the same as the data stored in the first volume 4a at the time when the synchronization is stopped. As a result, the contents of the second volume 4b may be backed up to a tape device or the like (not illustrated) while data sent from the host apparatus 2 is being stored in the first volume 4a.

The copy control unit 3b includes a first bitmap 3b1 and a second bitmap 3b2. The first bitmap 3b1 stores information regarding progress of a first copy process of copying data from each storage region of the first volume 4a to the second volume 4b under the equivalent state. The second bitmap 3b2 stores information regarding progress of second and later copy processes of copying data to the second volume 4b under the equivalent state. The first bitmap 3b1 is an example of a first memory, and the second bitmap 3b2 is an example of a second memory.

The first bitmap 3b1 and the second bitmap 3b2 respectively include a bit that indicates the progress of the copy process of copying data to the second volume 4b for each storage region of certain locations of the first volume 4a. A bit set to "1" for a storage region indicates that the copy process regarding the storage region is not completed. A bit set to "0" for a storage region indicates that the copy process regarding the storage region is completed.

When a reading failure has occurred in the first volume 4a while data stored in the first volume 4a and the second volume 4b is under the non-equivalent state, the identifying unit 3a identifies a first storage region A1 in which the reading failure has occurred.

Under the non-equivalent state, the copy control unit 3b copies only updated portions in order to conduct the next backup. The copy control unit 3b changes functions of the first bitmap 3b1 and second bitmap 3b2 under the non-equivalent state from functions under the equivalent state. Specifically, the first bitmap 3b1 is used to store information regarding the existence of data writing to the first volume 4a, and the second bitmap 3b2 is used to store information regarding the existence of data writing to the second volume 4b, under the non-equivalent state. A bit set to "1" for a storage region indicates that data writing to the storage region has occurred. A bit set to "0" for a storage region indicates that data writing to the storage region has not occurred.

Upon the identifying unit 3a identifying the first storage region A1 in which the reading failure has occurred, the copy control unit 3b refers to the bit (bit 5a in FIG. 1), which corresponds to the first storage region A1, of the first bitmap 3b1. The copy control unit 3b then determines whether or not data writing to the first storage region A1 has occurred. The copy control unit 3b also refers to a bit 5b, which corresponds to the bit 5a, of the second bitmap 3b2. The copy control unit 3b then determines whether or not data writing to a second storage region A2 that corresponds to the bit 5b has occurred.

If both of the bit 5a and the bit 5b are "0", the copy control unit 3b copies the data stored in the second storage region A2 of the second volume 4b to the first storage region A1 of the first volume 4a. Through this processing, the data stored in the first storage region A1 of the first volume 4a, in which the reading failure has occurred, may be recovered.

When data stored in the first volume 4a and the second volume 4b is switched from the non-equivalent state to the equivalent state, the copy control unit 3b reverts the functions of the first bitmap 3b1 and the second bitmap 3b2 to the functions under the equivalent state. Specifically, the copy control unit 3b merges the contents of the bits in the second bitmap 3b2 into the contents of the bits in the first bitmap 3b1. As a result of this processing, the bits set to "1" either in the first bitmap 3b1 or the second bitmap 3b2 are reflected in the first bitmap 3b1. All the bits in the second bitmap 3b2 are set to "0" after the merging.

The copy control unit 3b refers to the first bitmap 3b1 after switching from the non-equivalent state to the equivalent state and conducts a process (differential copy process) to copy, to the second volume 4b, the data stored in the storage regions of the first volume 4a, for which the bits are set to "1".

Hereinafter, a storage apparatus according to a second embodiment will be described in detail.

Second Embodiment

Figure 2:
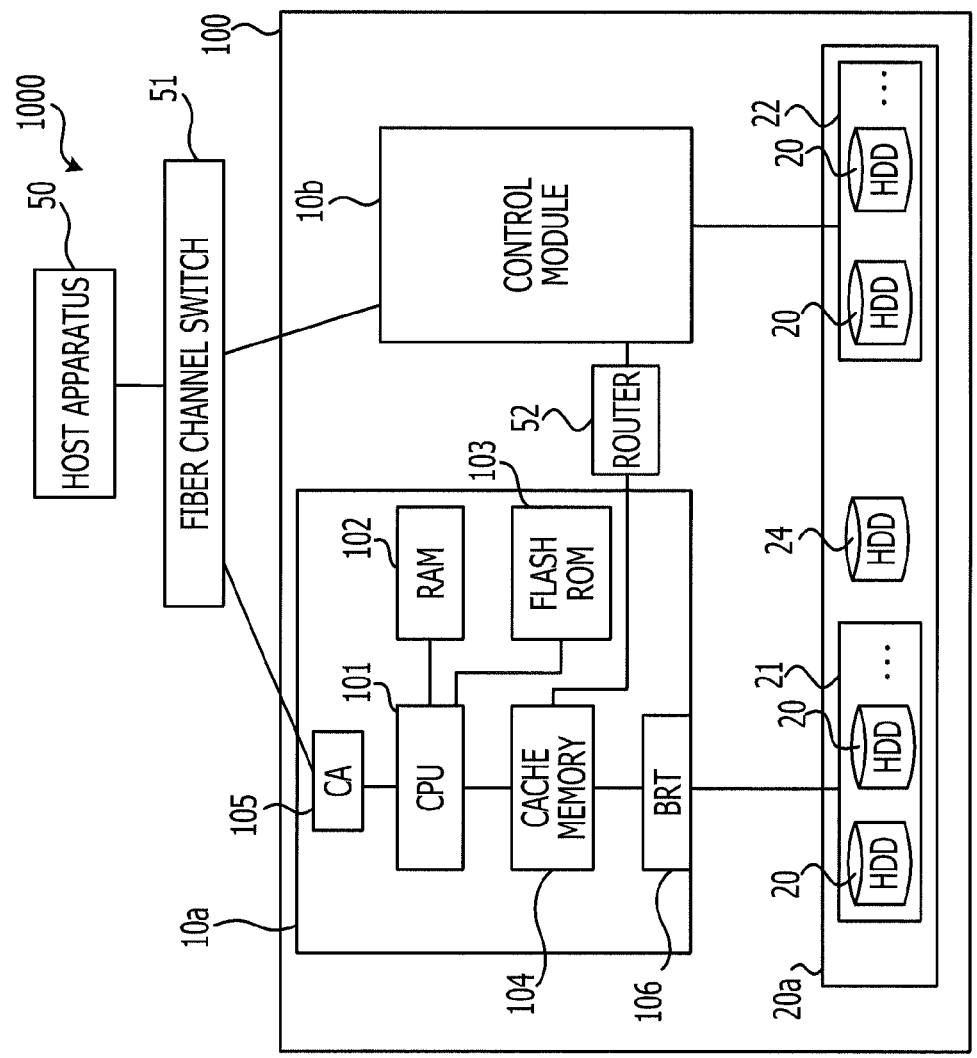
FIG. 2 is a block diagram illustrating an exemplary hardware configuration of a storage system according to a second embodiment.

FIG. 2 is a block diagram illustrating an exemplary hardware configuration of a storage system according to the second embodiment.

A storage system 1000 includes a host apparatus 50 and a storage apparatus 100 connected to the host apparatus 50 through a fiber channel (FC) switch 51. Although one host apparatus 50 is illustrated in FIG. 2 as being connected to the storage apparatus 100, a plurality of host apparatuses may be connected to the storage apparatus 100.

The storage apparatus 100 includes a drive enclosure (DE) 20a that includes a plurality of HDDs 20, and control modules (CM) 10a and 10b that manage physical storage regions of the drive enclosure 20a using the technique of a redundant array of inexpensive/independent disks (RAID). According to the present embodiment, the HDDs 20 are used to represent the storage media included in the drive enclosure 20a. However, SSDs or other storage media may be used as storage media without being limited to the HDDs. The plurality of HDDs 20 in the drive enclosure 20a may be referred to as HDDs 20 when not discriminating between one another. The total capacity of the HDDs 20 may range from, for example, 600 gigabytes (GB) to 240 terabytes (TB).

The storage apparatus 100 assures redundancy by using the two control modules 10a and 10b. The number of control modules included in the storage apparatus 100 is not limited to two, and redundancy may be assured with three or more control modules, or with only the control module 10a.

The control modules 10a and 10b are examples of control apparatuses and are realized in similar hardware configurations.

The control modules 10a and 10b control data access to a physical storage region of an HDD 20 in the drive enclosure 20a by the RAID technique in response to a data access request from the host apparatus 50.

Since the control modules 10a and 10b are both realized in similar hardware configurations, the hardware configuration of the control module 10a will be described as a representative.

The control module 10a includes a CPU 101, a random access memory (RAM) 102, a flash read only memory (ROM) 103, a cache memory 104, a channel adapter (CA) 105, and a back end router (BRT) 106.

The CPU 101 controls the entire control module 10a by executing programs stored in the flash ROM 103 or the like. The RAM 102 temporarily stores at least a portion of the programs executed by the CPU 101, and various types of data used for executing the programs. The flash ROM 103 is a non-volatile memory and stores programs executed by the CPU 101 and various types of data used for executing the programs.

The flash ROM 103 also acts as an evacuation location for data stored in the cache memory 104 when a power failure and the like occurs in the storage apparatus 100.

The cache memory 104 temporarily stores data written into the HDDs 20 and data read from the HDDs 20.

Upon receiving a data read command from the host apparatus 50, for example, the control module 10a determines whether or not the data to be read is stored in the cache memory 104. If the data to be read is stored in the cache memory 104, the control module 10a reads the data from the cache memory 104 and sends the read data to the host apparatus 50. The data may be sent to the host apparatus 50 more quickly than when read from the HDDs 20.

The cache memory 104 may also temporarily store data used for processing performed by the CPU 101. An example of the cache memory 104 is a volatile semiconductor device such as a static random access memory (SRAM). The storage capacity of the cache memory 104 may be, for example, approximately 2 to 64 GB, but is not limited to that.

The channel adapter 105 is connected to the fiber channel switch 51 and is connected to a channel of the host apparatus 50 via the fiber channel switch 51. The channel adapter 105 provides an interface function for sending and receiving data between the host apparatus 50 and the control module 10a.

The BRT 106 is connected to the drive enclosure 20a. The BRT 106 provides an interface function for sending and receiving data between the cache memory 104 and the HDDs 20 in the drive enclosure 20a. The control module 10a sends and receives data to and from the HDDs 20 in the drive enclosure 20a via the BRT 106.

The control modules 10a and 10b are connected to each other via a router 52. For example, when the host apparatus 50 sends data to be written into the HDDs 20 to the control module 10a through the fiber channel switch 51, the CPU 101 stores the received data in the cache memory 104. Along with storing the data, the CPU 101 also transmits the received data to the control module 10b via the router 52. A CPU in the control module 10b stores the received data in a cache memory in the control module 10b. As a result of this processing, identical data is stored in the cache memory 104 of the control module 10a and in a cache memory of the control module 10b.

A RAID group may be formed in the drive enclosure 20a. A RAID group is configured of one or more HDDs 20 among the plurality of HDDs 20 in the drive enclosure 20a. A RAID group may also be called a virtual disk or a RAID logical unit (RLU).

In FIG. 2, two RAID groups 21 and 22 configured in "RAID 5" are depicted. The RAID configuration of the RAID group 21 is merely an example and is not limited to the RAID configuration depicted in FIG. 2. For example, the RAID groups 21 and 22 may include any number of HDDs 20. The RAID groups 21 and 22 may also be configured in any RAID level such as "RAID 6" and the like.

For example, the storage regions of the HDDs 20 that make up the RAID group 21 are logically divided to make up logical volumes. A logical unit number (LUN) is assigned to each of the divided logical volumes.

An HDD 24 is prepared in the drive enclosure 20a in case of a failure in an HDD 20. The control modules 10a and 10b determine, for example, that a failure has occurred when the reading of data from the HDD 20 or the writing of data into the HDD 20 fails one time or more times due to a failure in the HDD 20 and the like. The HDD 24 waits in an energized state while the storage apparatus 100 is operating. The HDD 24 may also be called a hot spare disk. When a failure has occurred in any of the HDDs 20 in the RAID group 21 or 22, the control module managing the HDD 20 in which the failure has occurred conducts a rebuilding process to rebuild, in the HDD 24, the data (identical data) stored in the HDD 20 in which the failure has occurred. When the HDD 20 in which the failure has occurred is replaced with a normal HDD 20, the control module that manages the HDD 20 in which the failure has occurred conducts a process to copy (write back) the data stored in the HDD 24 back into the replaced normal HDD 20. The copy back process is conducted as a background process.

The following functions are provided to the storage apparatus 100 in the hardware configuration illustrated in FIG. 2.

Figure 3:
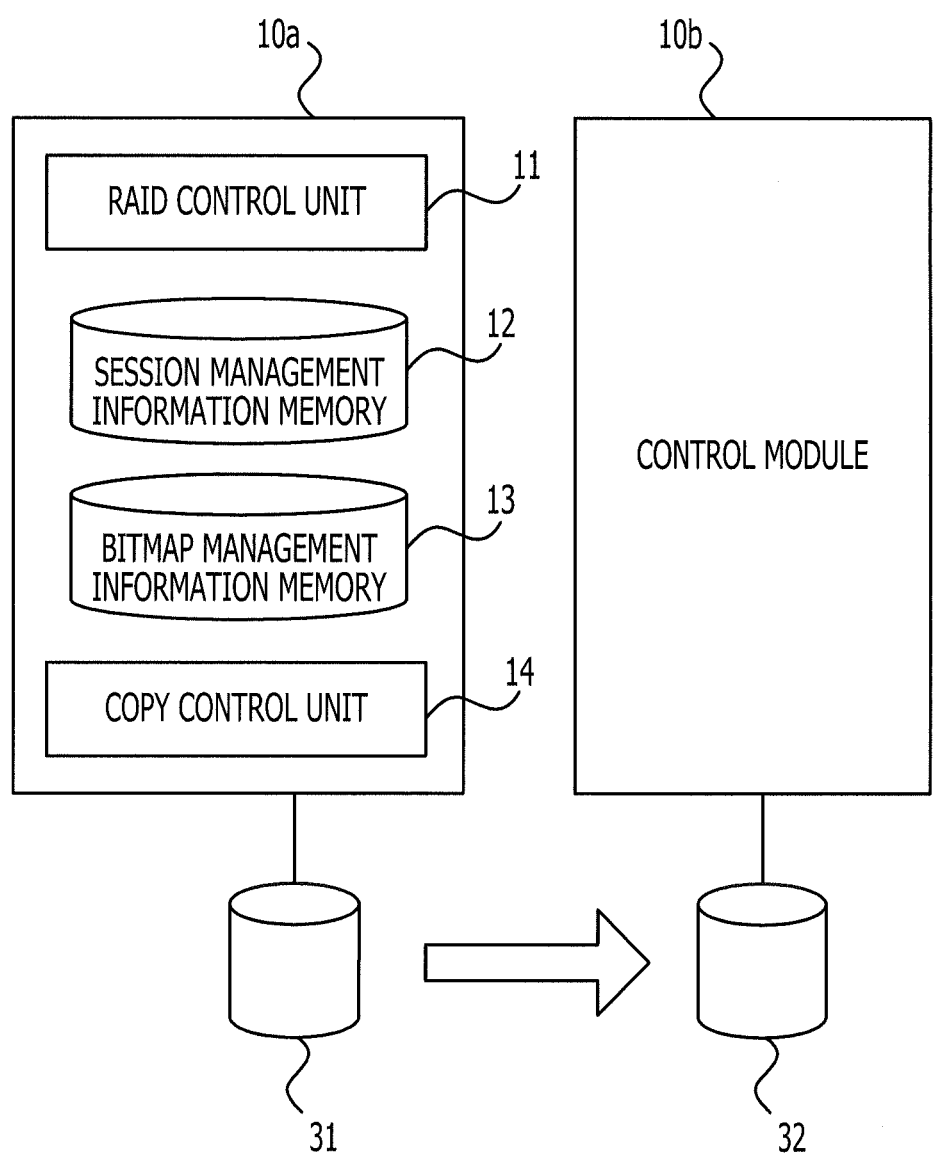
FIG. 3 is a block diagram illustrating an exemplary functional configuration of a control apparatus according to a second embodiment.

FIG. 3 is a block diagram illustrating an exemplary functional configuration of a control apparatus according to the second embodiment.

The control module 10a includes a RAID control unit 11, a session management information memory 12, a bitmap management information memory 13, and a copy control unit 14. The RAID control unit 11 is an example of the identifying unit.

The RAID control unit 11 controls input/output (I/O) access to a logical volume 31 from the host apparatus 50. The logical volume 31 is configured of all or a portion of the storage regions of the HDDs 20 that make up the RAID group 21.

The RAID control unit 11 instructs the copy control unit 14 to perform, inside the enclosure, an equivalent copy (EC) in response to a copy setting command issued by the host apparatus 50, that is, to store in a copy destination logical volume 32 data that is equivalent to data stored in the copy source logical volume 31. The copy destination logical volume 32 is configured of all or a portion of the storage regions of the HDDs 20 that make up a RAID group 22.

Hereinafter, a local equivalent copy is also referred to as "EC". When the next backup is conducted, the copy control unit 14 stops EC and makes a complete copy from the start by using a suspend function and a resume function which enable the complete copy by copying data in upgraded portions only. The suspend function is a function to temporarily interrupt an equivalency holding state established by EC. The resume function is a function to restart the equivalency holding state temporarily interrupted by the suspend function. By using EC function to conduct a differential copy from a temporarily interrupted state, a synchronous backup operation may be conducted more quickly.

When a disk failure occurs in the copy source logical volume 31 or the copy destination logical volume 32 during an I/O access, the RAID control unit 11 performs the above-mentioned rebuilding process. Specifically, when an HDD 20 that makes up a portion of the copy source logical volume 31 or the copy destination logical volume 32 is disconnected due to a failure, the RAID control unit 11 rebuilds data in the HDD 24 by using the remaining data stored in the HDD 20 in which the failure has occurred. The RAID control unit 11 generates, during the rebuilding process, data (hereinafter, referred to as "bad data") for identifying the fact that data has failed to be read, for the storage region from which the data has failed to be read out.

Upon generating the bad data in the copy source logical volume 31 or the copy destination logical volume 32 during the data rebuilding, the RAID control unit 11 sends notification information to the copy control unit 14. The notification information includes: (1) a group number of the RAID group in which the bad data was generated, (2) a volume number for identifying the logical volume in the RAID group in which the bad data was generated, (3) a bad data LBA which is a logical block address (LBA) of the starting block of the regions in the logical volume, in which the bad data was generated and (4) the number of blocks in which the bad data was generated.

The session management information memory 12 stores EC session management information generated by the RAID control unit 11 based on the command issued by the host apparatus 50.

The bitmap management information memory 13 stores bitmap management information set for each bitmap that manages progress of the copy process.

The types of bitmaps include an initial copy bitmap and an I/O extension bitmap. The initial copy bitmap stores information regarding progress of the first copy process of copying data to the copy destination logical volume for each storage region of a certain size of the copy source logical volume. The I/O extension bitmap stores information regarding progress of the second and later copy processes of copying data to the copy destination logical volume triggered by an I/O process.

The copy control unit 14 controls the data stored in the copy source logical volume 31 and the copy destination logical volume 32 as to be under the equivalent state or under the non-equivalent state.

Next, the session management information stored in the session management information memory 12 will be described.

FIG. 4 describes session management information.

In FIG. 4, the session management information is in the form of a table.

A session management table 12a illustrated in FIG. 4 is provided with a table number field, a copy source session identifier (ID) field, a copy type field, a state field, a phase field, a copy source logical volume field, a copy destination logical volume field, a copy source logical volume starting LBA field, a copy destination logical volume starting LBA field, a copy size field, an initial copy head offset field, an initial copy bitmap count field, an I/O extension head offset field, and an I/O extension bitmap count field.

A table number for identifying the session management table 12a is set in the table number field.

An ID for identifying the session managed in the copy source apparatus (control module 10a) is set in the copy source session ID field.

A value that indicates the type of the session (hereinafter, referred to as a "relevant session") managed by the current session management table 12a is set in the copy type field. For example, when the type of the relevant session is an EC session, "0x01" is set in the copy type field. When the type of the relevant session is a remote equivalent copy (REC) between enclosures, "0x00" is set in the copy type field.

A value indicating the state of the relevant session is set in the state field. For example, "0x00" is set in the state field when the state is an idle state. "0x01" is set in the state field when the state is a reserved state. "0x02" is set in the state field when the state is an active state, which is a state in which equivalency is being held between the volumes through EC. "0x03" is set in the state field when the state is an error suspend state. "0x04" is set in the state field when the state is a suspend state in which the state of holding equivalency between the volumes through EC is interrupted.

A value indicating the phase of the relevant session is set in the phase field. For example, "0x01" is set in the phase field when data is being copied from the copy source logical volume 31 to the copy destination logical volume 32. "0x02" is set in the phase field when the copy process of copying data from the copy source logical volume 31 to the copy destination logical volume 32 is completed (that is, equivalent).

A value for identifying the data copy source logical volume is set in the copy source logical volume field.

A value for identifying the data copy destination logical volume is set in the copy destination logical volume field.

A value that indicates a copy starting position (a logical block address) of the copy source logical volume is set in the copy source logical volume starting LBA field.

A value that indicates a copy starting position of the copy destination logical volume is set in the copy destination logical volume starting LBA field.

A value that indicates a copy capacity is set in the copy size field in block units.

Position information of the head table of initial copy bitmap management tables that manage the bitmaps of the relevant session is set in the initial copy head offset.

A count of the initial copy bitmaps used in the relevant session is set in the initial copy bitmap count field. The size of a storage region that is managed by one bitmap is fixed. As a result, a plurality of bitmaps are prepared according to the storage regions if the size of the logical volume storage region exceeds the size of the storage region that is managed by one bitmap.

Position information of the head table of I/O extension bitmap management tables that manage the bitmaps of the relevant session is set in the I/O extension head offset field.

A count of the I/O extension bitmaps used in the relevant session is set in the I/O extension bitmap count field. The initial copy bitmap count and the I/O extension bitmap count reflect the same count.

Next, bitmap management information will be described.

FIG. 5 describes bitmap management information.

In FIG. 5, the bitmap management information is in the form of a table.

A bitmap management table 13a illustrated in FIG. 5 is provided with a flag field, a session management table number field, and a bitmap address field.

A value that identifies whether the bitmap associated with the relevant bitmap management table 13a is for an initial copy or for an I/O extension is set in the flag field.

A table number of the session management table 12a that uses the relevant bitmap management table 13a is set in the session management table number field.

A start address of the bitmap managed by the relevant bitmap management table 13a is set in the bitmap address field.

Processing of the copy control unit 14 will be described next.

Figures 6A, 6B, 6C:
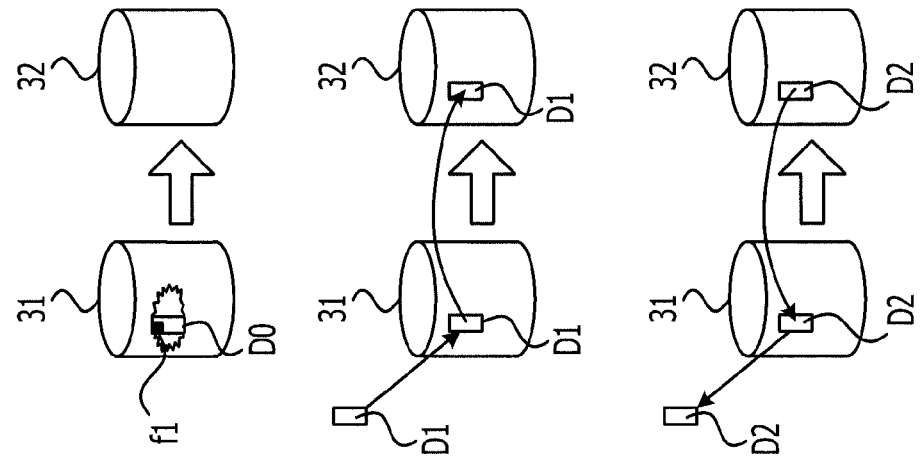
FIGS. 6A to 6C describe processing performed by a copy control unit when bad data is generated in a copy source logical volume under an active state.

FIGS. 6A to 6C describe processing performed by a copy control unit when bad data is generated in a copy source logical volume under an active state.

Bad data information (flag) f1 that indicates whether or not the relevant block includes bad data is stored in the head page of each block formed in each storage region of the copy source logical volume 31 and the copy destination logical volume 32.

As illustrated in FIG. 6A, when bad data D0 is generated in certain regions of the copy source logical volume 31, the RAID control unit 11 notifies the copy control unit 14 of the regions (hereinafter, referred to as "generation regions") in which the bad data D0 is generated. The bits of an initial copy bitmap B1, which correspond to the generation regions, are underlined in FIG. 6A. The copy control unit 14 refers to the I/O extension bitmap B2 and sets the bits of the I/O extension bitmap B2, which correspond to the generation regions, to "1" if the bits indicate "0" (copy completed). As a result, the processing described below with reference to FIG. 6C may be conducted.

FIG. 6B illustrates a situation in which the RAID control unit 11 has received from the host apparatus 50 a write request to write data D1 to the generation regions of the copy source logical volume 31 after the processing described above with reference to FIG. 6A. The RAID control unit 11 may erase the bad data D0 such that the copy control unit 14 overwrites the bad data D0 in the generation regions of the copy source logical volume 31 with the received data D1. Since the writing is conducted under the active state, the copy control unit 14 copies the received data D1 to the storage regions for which the bits of the I/O extension bitmap B2 of the copy destination logical volume 32 are set to "1". When the copy process is completed, the copy control unit 14 sets the bits of the I/O extension bitmap B2, which have been set to "1", to "0".

FIG. 6C illustrates a situation in which the RAID control unit 11 has received from the host apparatus 50 a read request to read data from the generation regions of the copy source logical volume 31 after the processing described above with reference to FIG. 6A. The copy control unit 14 searches for the bits of the I/O extension bitmap B2, which correspond to the generation regions. When a bit is set to "1" due to other than an I/O process, the copy control unit 14 determines that the bit is set to "1" due to the generation of the bad data D0. The copy control unit 14 may determine that the bit is set to "1" due to an I/O process when, for example, the copy process corresponding to a range in which the bits are set to "1" is being conducted. Conversely, the copy control unit 14 may determine that the bit is set to "1" due to other than an I/O process when the copy process corresponding to a range in which the bits are set to "1" is not being conducted. When the copy control unit 14 determines that the bits are set to "1" due to the generation of the bad data D0, the copy control unit 14 copies data D2 stored in the storage regions of the copy destination logical volume 32, which correspond to the generation regions, to the copy source logical volume 31. When the copy process is completed, the copy control unit 14 sets the bits of the I/O extension bitmap B2, which correspond to the generation regions, to "0". The RAID control unit 11 then reads the data D2 stored in the generation regions of the copy source logical volume 31 and sends the read data D2 to the host apparatus 50.

Figure 7:
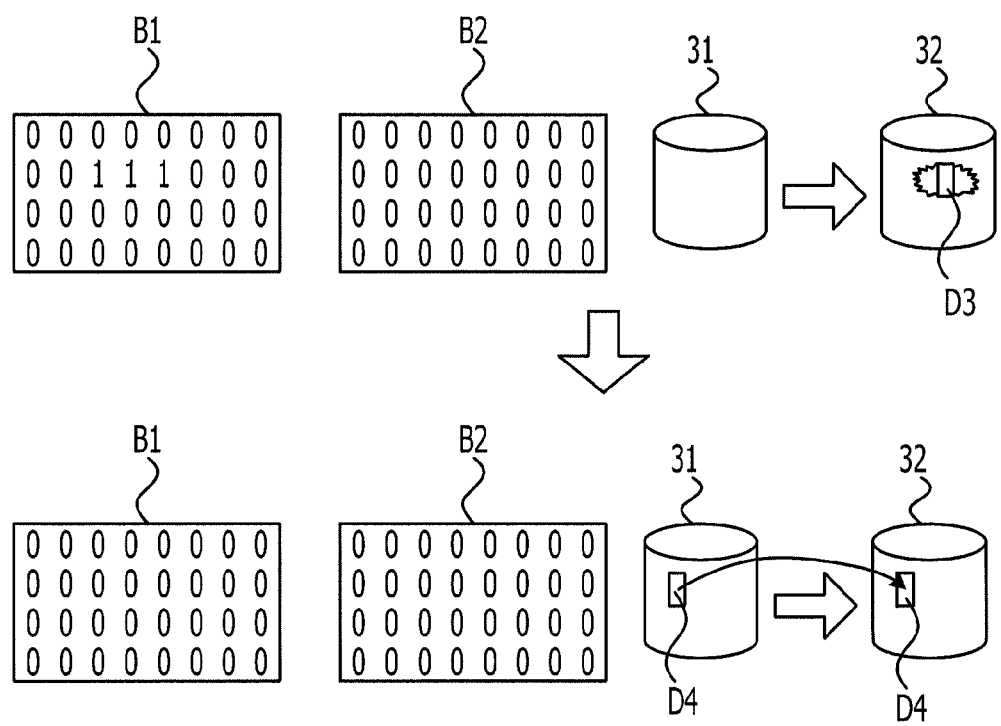
FIG. 7 describes processing performed by a copy control unit when bad data is generated in a copy destination logical volume under an active state.

FIG. 7 describes processing performed by a copy control unit when bad data is generated in a copy destination logical volume under an active state.

When bad data D3 is generated in certain regions of the copy destination logical volume 32, the RAID control unit 11 notifies the copy control unit 14 of the generation regions and sets the bits of the initial copy bitmap B1, which correspond to the generation regions, to "1". The bits of the I/O extension bitmap B2, which correspond to the generation regions, may be set to "1". By setting the bits to "1", even if an error occurs during the copy process, the generation regions may be identified after the error is recovered. Therefore, error recovery is possible. The copy control unit 14 copies data D4 stored in the storage regions of the copy source logical volume 31, which correspond to the generation regions, to the copy destination logical volume 32 regardless of whether or not an initial copy from the copy source logical volume 31 was conducted. When the copy of data D4 is completed, the bits of the initial copy bitmap B1 corresponding to the generation regions are set to "0".

Figure 8:
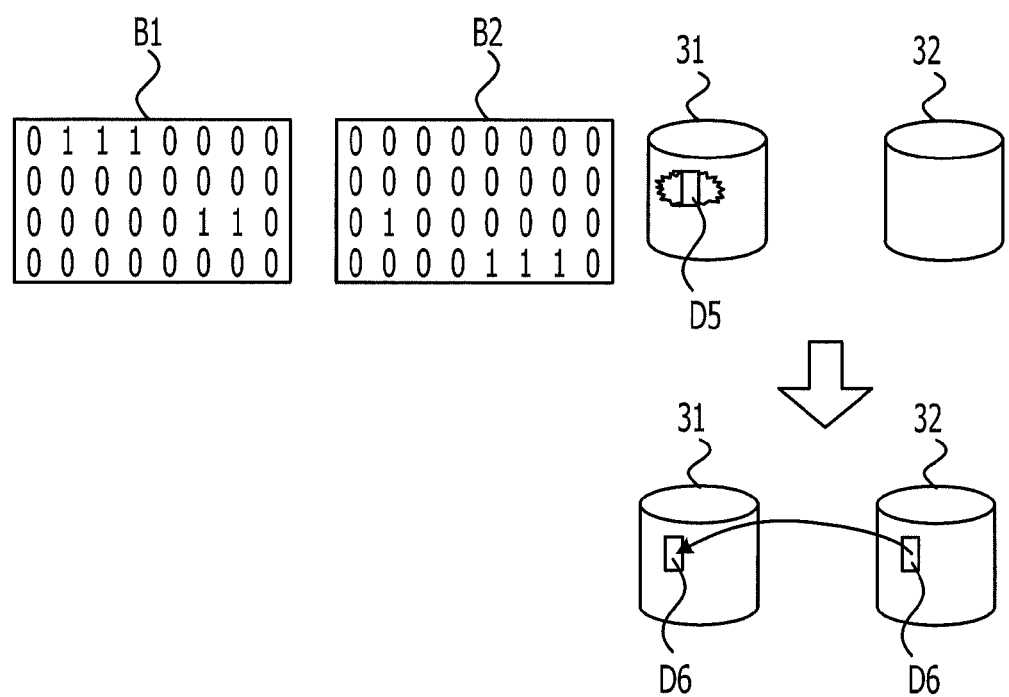
FIG. 8 describes processing performed by a copy control unit when bad data is generated in a copy source logical volume under a suspend state.

FIG. 8 describes processing performed by a copy control unit when bad data is generated in a copy source logical volume under a suspend state.

Under the suspend state, the copy control unit 14 uses the initial copy bitmap B1 and the I/O extension bitmap B2 differently from the active state. Specifically, the copy control unit 14 uses the initial copy bitmap B1 as a bitmap for determining the occurrence of an upgrade of the copy source logical volume 31, and uses the I/O extension bitmap B2 as the bitmap for determining the occurrence of an upgrade of the copy destination logical volume 32.

When bad data D5 is generated in certain regions of the copy source logical volume 31, the RAID control unit 11 notifies the copy control unit 14 of the generation regions.

The copy control unit 14 determines whether or not a data upgrade has occurred in either the generation regions of the copy source logical volume 31 or in the storage regions of the copy destination logical volume 32, which correspond to the generation regions. Specifically, the copy control unit 14 checks the bits of the initial copy bitmap B1, which correspond to the generation regions, and checks the bits of the I/O extension bitmap B2, which correspond to the generation regions. When any of the bits, which correspond to the generation regions, of the initial copy bitmap B1 and the I/O extension bitmap B2 is "1", the copy control unit 14 determines that a data upgrade has occurred. Whether or not a data upgrade has occurred may be easily determined by using the initial copy bitmap B1 and the I/O extension bitmap B2 differently from the active state.

When no data upgrade has occurred in any of the corresponding regions of the copy source logical volume 31 and the copy destination logical volume 32, the copy control unit 14 overwrites data stored in the generation regions with data D6 stored in the storage regions of the copy destination logical volume 32, which correspond to the generation regions, even though under the suspend state. The overwriting is conducted as a background process. The overwriting may restore the data in the generation regions of the copy source logical volume 31.

The copy control unit 14 reverts roles of the initial copy bitmap B1 and the I/O extension bitmap B2 to their original roles under a resume state which is a state of holding equivalency, switched from the suspend state. Specifically, the copy control unit 14 merges the states of the bits of the I/O extension bitmap B2 into the corresponding bits of the initial copy bitmap B1.

The copy control unit 14 refers to the initial copy bitmap B1 under the resume state to conduct a process (differential copy process) to copy the data stored in the storage regions of the copy source logical volume 31, in which the bits are set to "1", to the copy destination logical volume 32.

Figure 9:
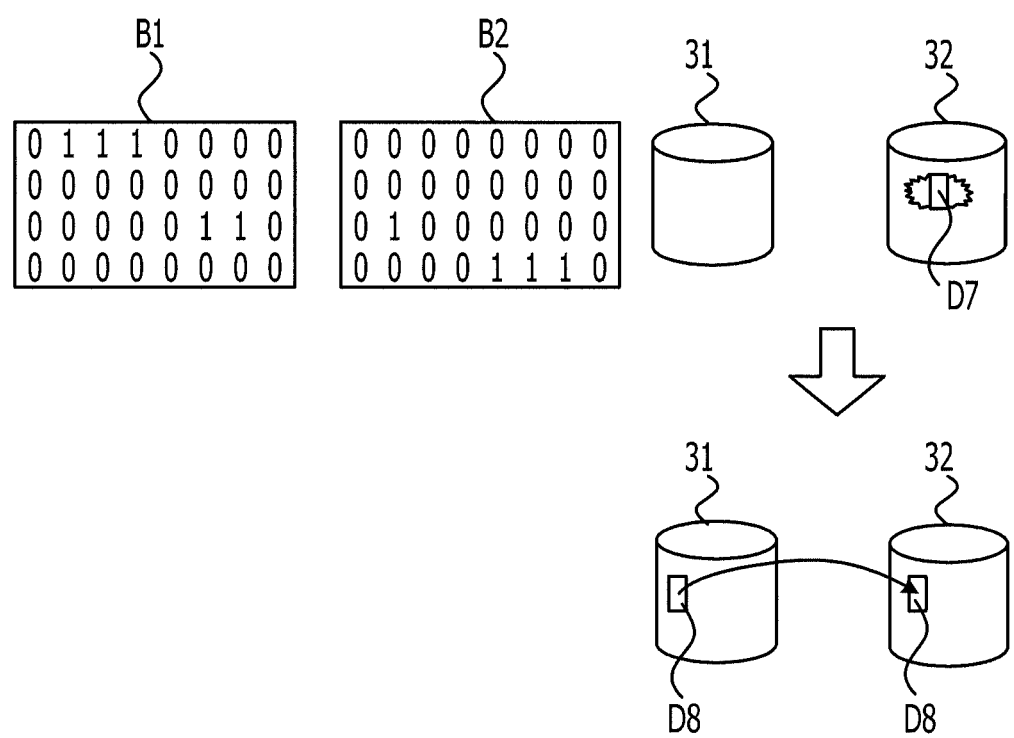
FIG. 9 describes processing performed by a copy control unit when bad data is generated in a copy destination logical volume under a suspend state.

FIG. 9 describes processing performed by the copy control unit when bad data is generated in a copy destination logical volume under a suspend state.

When bad data D7 is generated in certain regions of the copy destination logical volume 32, the RAID control unit 11 notifies the copy control unit 14 of the generation regions.

As described above with reference to FIG. 8, the copy control unit 14 determines whether or not a data upgrade has occurred in either the generation regions of the copy source logical volume 31 or in the storage regions of the copy destination logical volume 32, which correspond to the generation regions. When bad data D7 is generated in the copy destination logical volume 32, the generation region data is kept the same as in the suspend time if no upgrade of the generation region data has occurred in the copy source logical volume 31 and the copy destination logical volume 32. Therefore, the copy control unit 14 overwrites the bad data D7 with data D8 stored in the storage regions of the copy source logical volume 31, which correspond to the generation regions, even though under the suspend state. The overwriting is conducted as a background process. The overwriting may restore the data in the generation regions of the copy destination logical volume 32 as described above.

The copy control unit 14 then reverts roles of the initial copy bitmap B1 and the I/O extension bitmap B2 to their original roles under the resume state which is a state of holding equivalency, switched from the suspend state.

A bad data recovery process conducted by the copy control unit 14 upon receiving the notification information from the RAID control unit 11 will be described with reference to a flowchart.

Figure 10:
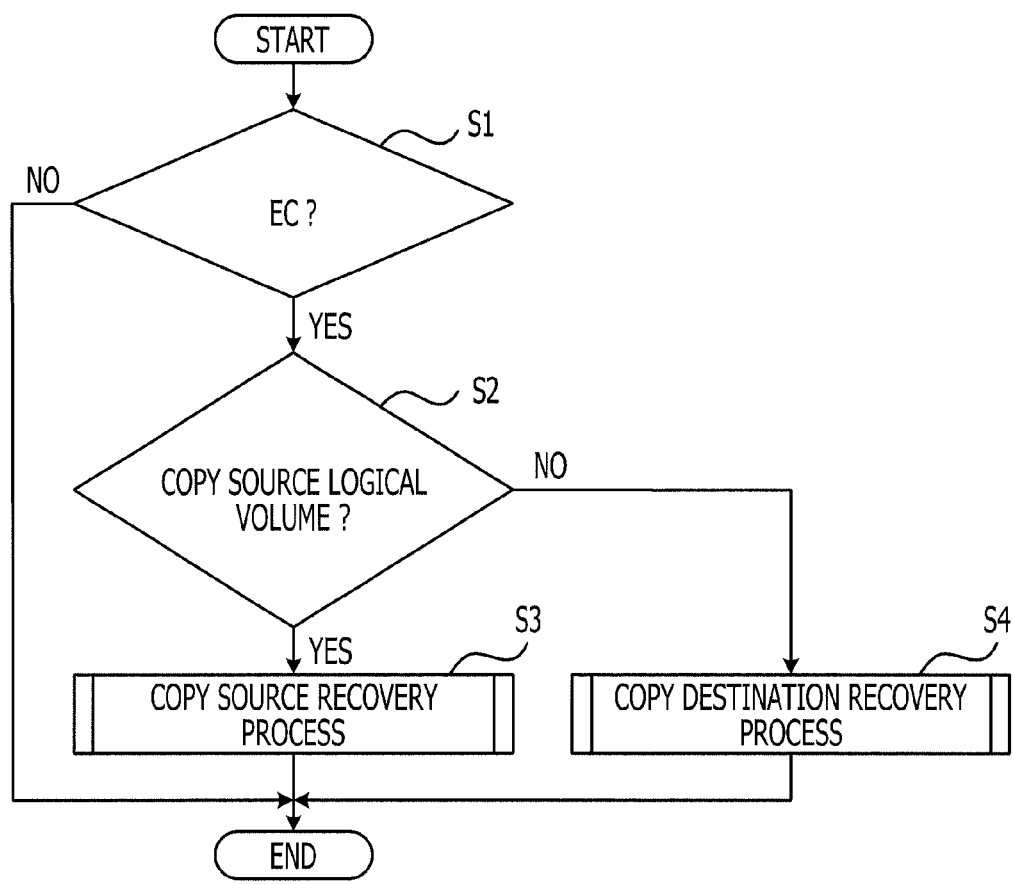
FIG. 10 is a flowchart of a bad data recovery process.

FIG. 10 is a flowchart of a bad data recovery process.

(In S1) The copy control unit 14 refers to the copy source logical volume starting LBA field and the copy type field of all the session management tables 12a stored in the session management information memory 12, to determine whether or not the logical volume including a block having the bad data LBA notified in the notification information is subject to copying by EC. Specifically, The copy control unit 14 tries to identify a session management table 12a that has "0x01" in the copy type field and has, in the copy source logical volume starting LBA field, a starting LBA of a logical volume including a block having the bad data LBA. Upon identifying such a session management table 12a, the copy control unit 14 determines that the block having the bad data LBA is subject to copying by EC. The bad data recovery process moves to S2 when the block having the bad data LBA is subject to copying by EC (Yes in S1). The bad data recovery process in FIG. 10 is finished when the block having the bad data LBA is not subject to copying by EC (No in S1). The copy control unit 14 may transmit an error message to a management apparatus (not illustrated) that manages the storage apparatus 100 when the block having the bad data LBA is not subject to copying by EC.

(In S2) The copy control unit 14 refers to the copy source logical volume field of the identified session management table 12a to determine whether or not the volume number included in the notification information indicates the copy source logical volume 31. When the volume number indicates the copy source logical volume 31 (Yes in S2), the bad data recovery process moves to S3. When the volume number does not indicate the copy source logical volume 31, in other words, when the volume number indicates the copy destination logical volume 32 (No in S2), the bad data recovery process moves to S4.

(In S3) the copy control unit 14 conducts a copy source recovery process for recovering the bad data generated in the copy source logical volume 31. The copy source recovery process will be described later. The bad data recovery process in FIG. 10 is finished when the copy source recovery process is completed.

(In S4) the copy control unit 14 conducts a copy destination recovery process for recovering the bad data generated in the copy destination logical volume 32. The copy destination recovery process will be described later. The bad data recovery process in FIG. 10 is finished when the copy destination recovery process is completed.

The copy source recovery process of S3 in FIG. 10 will be described below.

Figure 11:
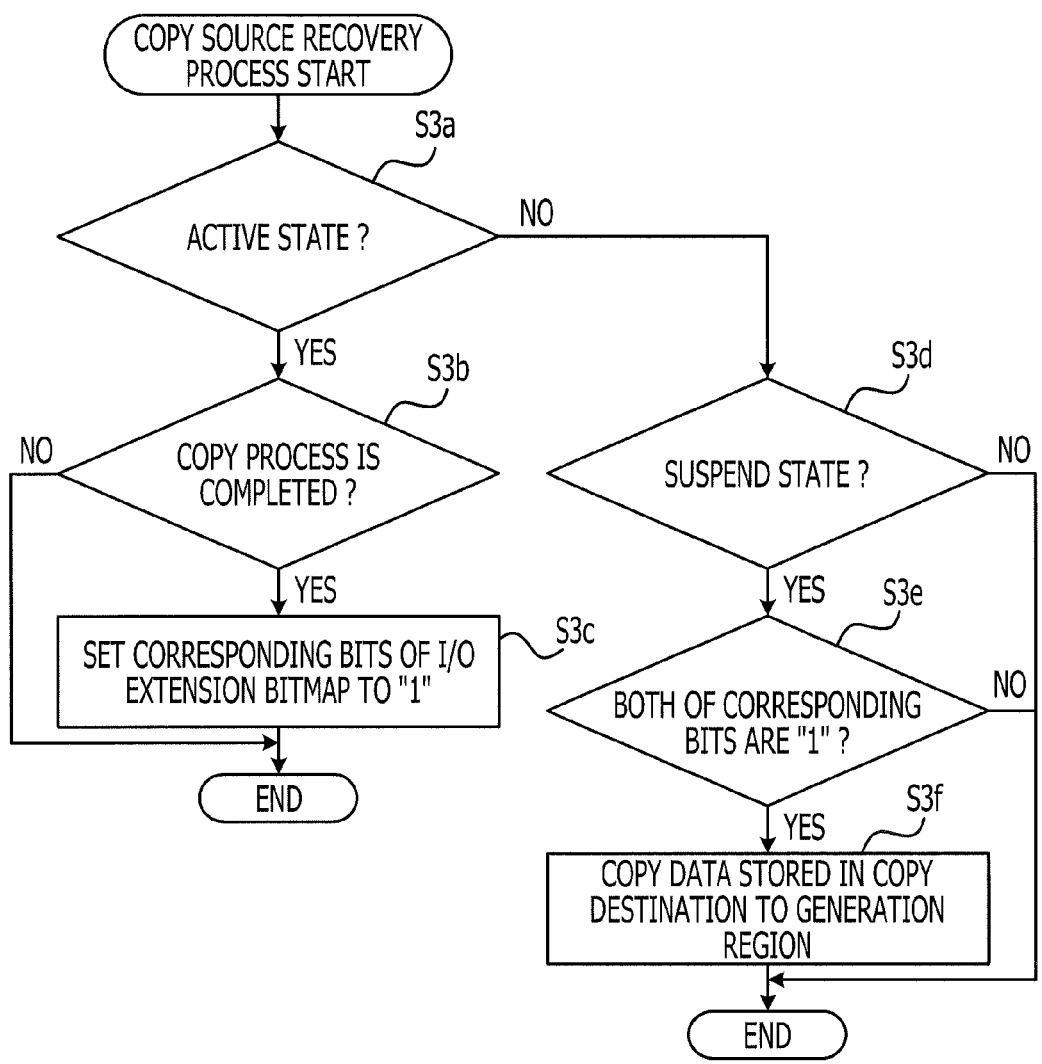
FIG. 11 is a flowchart of a copy source recovery process.

FIG. 11 is a flowchart of the copy source recovery process.

(In S3a) The copy control unit 14 refers to the state field of the identified session management table 12a to determine whether or not the state of the EC session (hereinafter, referred to as a "relevant EC session" regarding the copy source recovery process) that involves the copy source logical volume 31 is the active state ("0x02"). The copy source recovery process moves to S3b when the state of the relevant EC session is the active state (Yes in S3a). The copy source recovery process moves to S3d when the state of the relevant EC session is not the active state (No in S3a).

(In S3b) The copy control unit 14 determines whether or not the copy process of copying data in the generation regions is completed. Specifically, the copy control unit 14 refers to the initial copy bitmap (the bitmap B1 is assumed in the following description) specified in the initial copy head offset field of the identified session management table 12a to determine whether or not the bits corresponding to the generation regions are set to "0". When the copy process of copying data in the generation regions is completed (Yes in S3b), the copy source recovery process moves to S3c. When the copy process of copying data in the generation regions is not completed (No in S3b), the copy source recovery process in FIG. 11 is finished.

(In S3c) The copy control unit 14 sets to "1" the bits, which correspond to the generation regions, of the I/O extension bitmap (bitmap B2 is assumed in the following description) specified in the I/O extension head offset field of the identified session management table 12a. The copy source recovery process in FIG. 11 is then finished.

(In S3d) The copy control unit 14 refers to the state field of the identified session management table 12a to determine whether or not the state of the relevant EC session is the suspend state. The copy source recovery process moves to S3e when the state of the relevant EC session is the suspend state (Yes in S3d). The copy source recovery process in FIG. 11 is finished when the state of the relevant EC session is not the suspend state (No in S3d).

(In S3e) The copy control unit 14 refers to the initial copy bitmap B1 to check the values of the bits corresponding to the generation regions. The copy control unit 14 also checks the values of the bits of the I/O extension bitmap B2, which correspond to the checked bits in the initial copy bitmap B1. The copy control unit 14 then determines whether or not both of the corresponding bits are "1" (not upgraded). When both of the corresponding bits are "1" (Yes in S3e), the copy source recovery process moves to S3f. When any of the corresponding bits is not "1" (No in S3e), the copy source recovery process in FIG. 11 is finished. In this case, recovery of the bad data is not conducted.

(In S3f) The copy control unit 14 overwrites the bad data by copying the data stored in the storage regions, which correspond to the generation regions, of the copy destination logical volume 32 to the generation regions. The copy source recovery process in FIG. 11 is then finished.

The copy destination recovery process of S4 in FIG. 10 will be described below.

Figure 12:
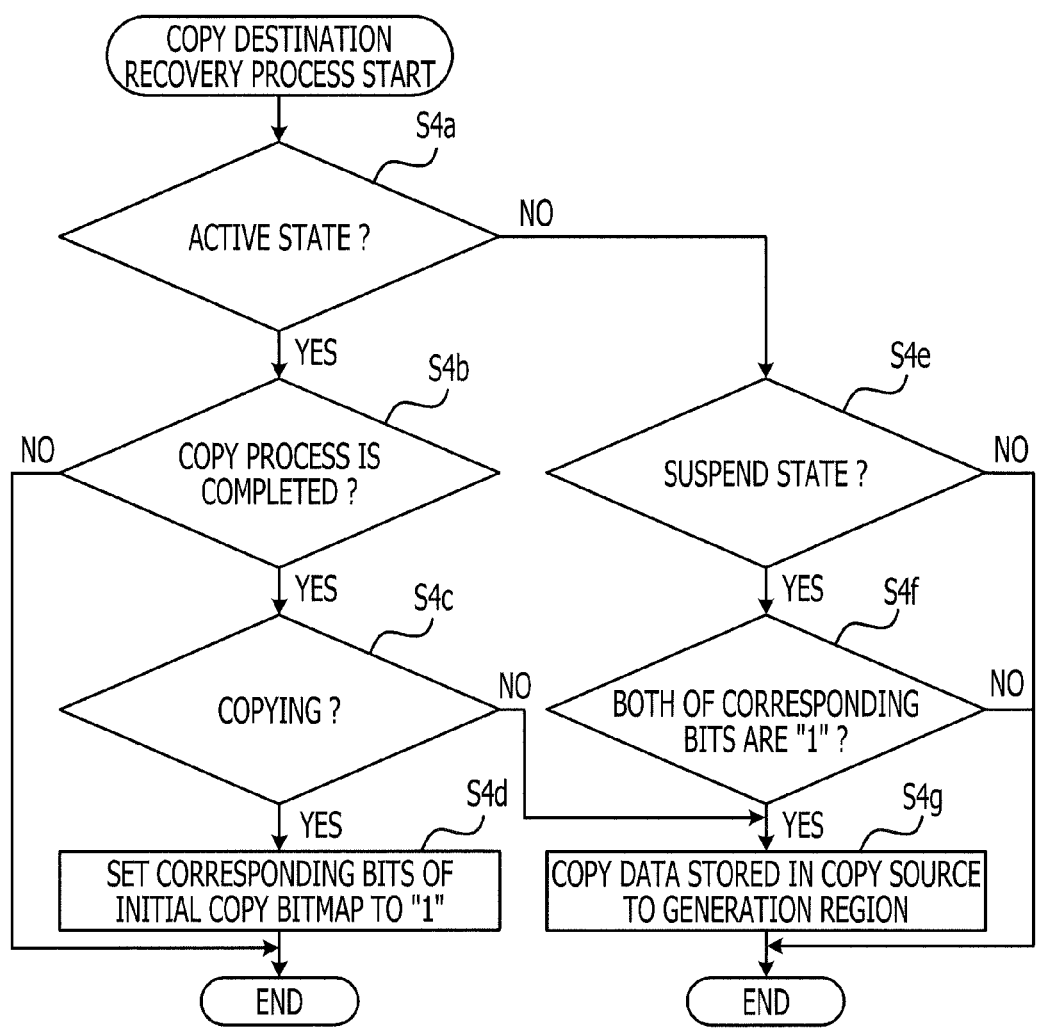
FIG. 12 is a flowchart of a copy destination recovery process.

FIG. 12 is a flowchart of the copy destination recovery process.

(In S4a) The copy control unit 14 refers to the state field of the identified session management table 12a to determine whether or not the state of the EC session (hereinafter, referred to as a "relevant EC session" regarding the copy destination recovery process) that involves the copy destination logical volume 32 is the active state. The copy destination recovery process moves to S4b when the state of the relevant EC session is the active state (Yes in S4a). The copy destination recovery process moves to S4e when the state of the relevant EC session is not the active state (No in S4a).

(In S4b) The copy control unit 14 refers to the initial copy bitmap B1 specified in the initial copy head offset field of the identified session management table 12a to determine whether or not the copy process of copying data in the generation regions is completed. When the copy process of copying data in the generation regions is completed (Yes in S4b), the copy destination recovery process moves to S4c. When the copy process of copying data in the generation regions is not completed (No in S4b), the copy destination recovery process in FIG. 12 is finished.

(In S4c) The copy control unit 14 refers to the phase field of the identified session management table 12a to determine whether or not the copy process is currently being conducted. When the copy process is currently being conducted (S4c Yes), the copy destination recovery process moves to S4d. When the copy process is not currently being conducted, in other words, when the phase field indicates that bitmaps B1 and B2 are equivalent (No in S4c), the copy destination recovery process moves to S4g.

(In S4d) The copy control unit 14 sets to "1" the bits, which correspond to generation regions, of the initial copy bitmap B1. The copy destination recovery process in FIG. 12 is then finished.

(In S4e) The copy control unit 14 refers to the state field of the identified session management table 12a to determine whether or not the state of the relevant EC session is the suspend state. The copy destination recovery process moves to S4f when the state of the relevant EC session is the suspend state (Yes in S4d). The copy destination recovery process in FIG. 12 is finished when the state of the relevant EC session is not the suspend state (No in S4e).

(In S4f) The copy control unit 14 refers to the initial copy bitmap B1 to check the values of the bits corresponding to the generation regions. The copy control unit 14 also checks the values of the bits of the I/O extension bitmap B2, which correspond to the checked bits in the initial copy bitmap B1. The copy control unit 14 then determines whether or not both of the corresponding bits are "1" (not upgraded). When both of the corresponding bits are "1" (Yes in S4f), the copy destination recovery process moves to S4g. When any of the corresponding bits is not "1" (No in S4f), the copy destination recovery process in FIG. 12 is finished.

(In S4g) The copy control unit 14 overwrites the bad data by copying the data stored in the storage regions, which correspond to the generation regions, of the copy source logical volume 31 to the generation regions. The copy destination recovery process in FIG. 12 is then finished.

A state switching process performed by the copy control unit 14 when switching from the suspend state to the resume state is described below.

Figure 13:
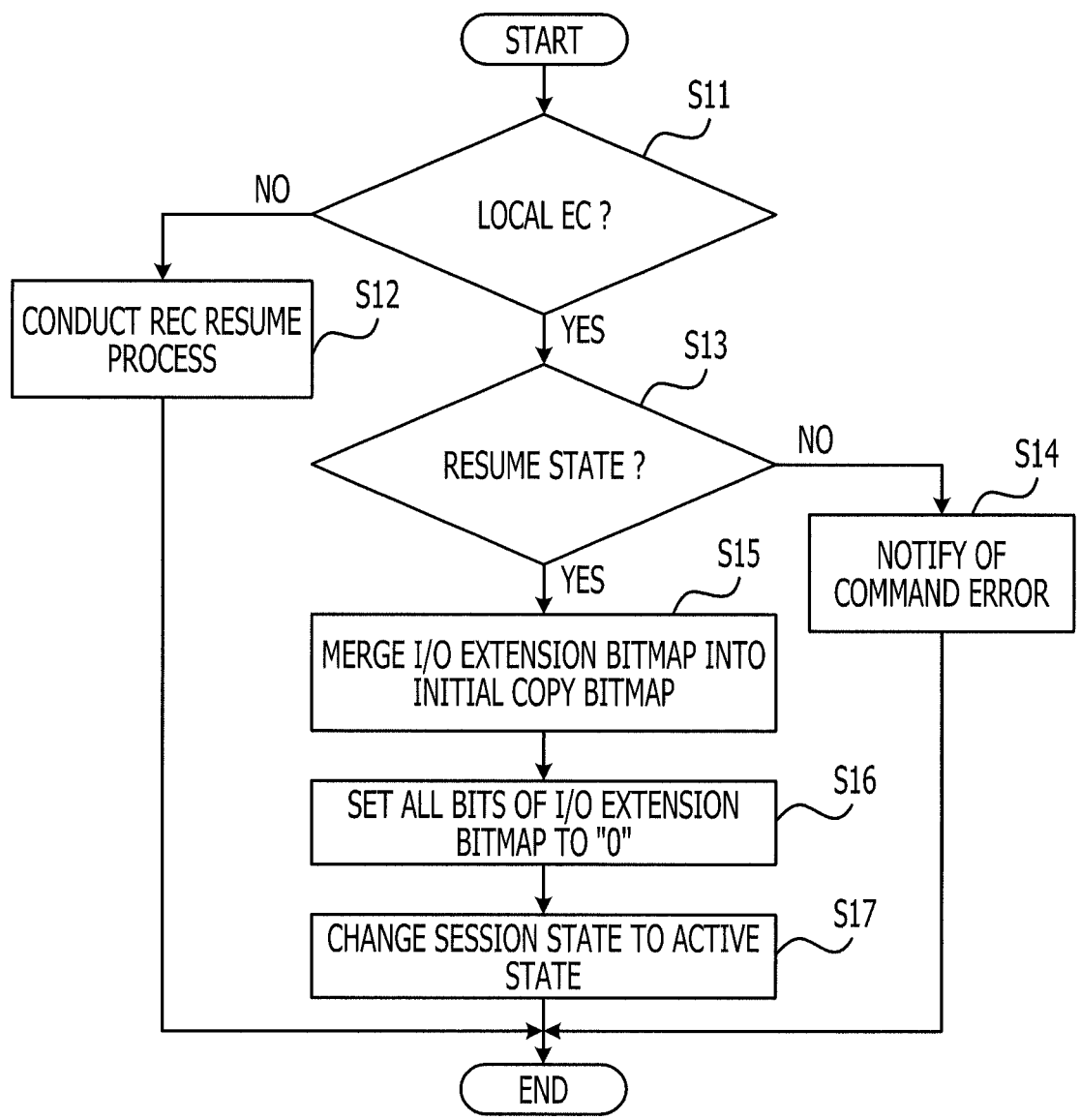
FIG. 13 is a flowchart of a state switching process.

FIG. 13 is a flowchart of the state switching process.

(In S11) The copy control unit 14 determines whether or not the session (hereinafter, referred to as a "relevant session" regarding the state switching process) which is subject to a processing specified in an I/O request is for a local EC. The state switching process moves to S13 when the relevant session is for a local EC (Yes in S11). The state switching process moves to S12 when the relevant session is not for a local EC (No in S11).

(In S12) The copy control unit 14 conducts an REC resume process. The state switching process in FIG. 13 is then finished.

(In S13) The copy control unit 14 refers to the identified session management table 12a to determine whether or not the relevant session is in the resume state. The state switching process moves to S15 when the relevant session is under the resume state (Yes in S13). The state switching process moves to S14 when the relevant session is not under the resume state (No in S13).

(In S14) The copy control unit 14 notifies the host apparatus 50 of a command error. The state switching process in FIG. 13 is then finished.

(In S15) The copy control unit 14 merges the values of the bits of the I/O extension bitmap B2 into the bits of the initial copy bitmap B1. The state switching process then moves to S16.

(In S16) The copy control unit 14 sets all the bits of the I/O extension bitmap B2 to "0". The state switching process then moves to S17. Through S15 and S16, the initial copy bitmap B1 and the I/O extension bitmap B2, whose roles have been changed due to the switch from the active state to the suspend state, is prepared to be used under the active state.

(In S17) The copy control unit 14 changes the state field of the identified session management table 12a to indicate the active state. The state switching process in FIG. 13 is then finished.

An I/O process performed by the copy control unit 14 upon receiving an I/O request from the host apparatus 50 will be described below.

Figure 14:
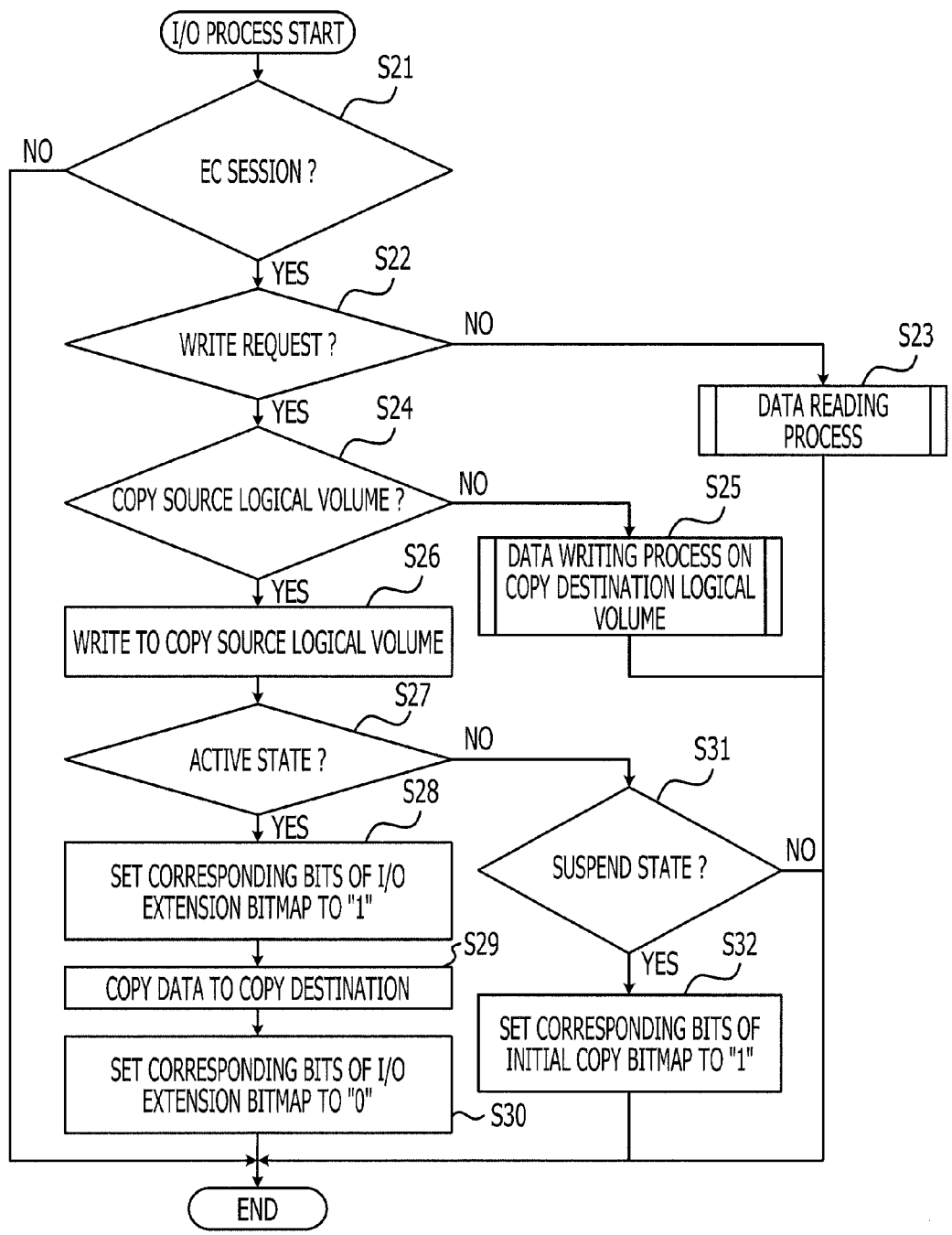
FIG. 14 is a flowchart of I/O process.

FIG. 14 is a flowchart of the I/O process.

(In S21) The copy control unit 14 determines whether or not the I/O request involves a logical volume for which an EC session has been established. Specifically, the copy control unit 14 respectively compares data for identifying the copy source logical volume, data for identifying the copy starting LBA, and the copy size, which are included in the I/O request, with data in the copy source logical volume field, the copy source logical volume starting LBA field, and the copy size field of the session management table 12a. Then, the copy control unit 14 checks the copy type field of the matched session management table 12a. When the I/O request involves a logical volume for which an EC session has been established (Yes in S21), the I/O process moves to S22. When the I/O request does not involve a logical volume for which an EC session has been established (No in S21), the I/O process in FIG. 14 is finished.

(In S22) The copy control unit 14 determines whether or not the I/O request is a write request. When the I/O request is a write request (Yes in S22), the I/O process moves to S24. When the I/O request is not a write request, in other words, when the I/O request is a read request (No in S22), the I/O process moves to S23.

(In S23) The copy control unit 14 conducts a data reading process of reading data specified in the I/O request from the copy source logical volume 31 or the copy destination logical volume 32. The data reading process will be described later. The I/O process in FIG. 14 is finished when the data reading process is completed.

(In S24) The copy control unit 14 refers to the data write destination address included in the I/O request to determine whether or not the access target of the I/O request is the copy source logical volume 31. When the access target of the I/O request is the copy source logical volume 31 (Yes in S24), the I/O process moves to S26. When the access target of the I/O request is not the copy source logical volume 31, in other words, when the access target of the I/O request is the copy destination logical volume 32 (No in S24), the I/O process moves to S25.

(In S25) The copy control unit 14 conducts a data writing process to write the write target data included in the I/O request to the copy destination logical volume 32. The data writing process will be described later. The I/O process in FIG. 14 is finished when the data writing process is completed.

(In S26) The copy control unit 14 writes the write target data included in the I/O request to the copy source logical volume 31. When the writing is completed, the copy control unit 14 notifies the host apparatus 50 that the process in response to the I/O request is completed. The I/O process then moves to S27.

(In S27) The copy control unit 14 refers to the state field of the session management table 12a to determine whether or not the relevant EC session is under the active state. The I/O process moves to S28 when the relevant EC session is under the active state (Yes in S27). The I/O process moves to S31 when the state of the relevant EC session is not under the active state (No in S27).

(In S28) The copy control unit 14 sets to "1" the bits of the I/O extension bitmap B2, which correspond to the write target regions specified in the I/O request. The I/O process then moves to S29.

(In S29) The copy control unit 14 copies the data stored in the copy source logical volume 31 to the storage regions corresponding to the bits of the I/O extension bitmap B2 set to "1" in S28. Through S29, the data written to the copy source logical volume 31 in S26 is copied to the copy destination logical volume 32. The I/O process moves to S30 when the copy is completed.

(In S30) The copy control unit 14 sets to "0" the bit of the I/O extension bitmap B2 corresponding to the write target regions. The I/O process in FIG. 14 is then finished.

(In S31) The copy control unit 14 refers to the state field of the session management table 12a to determine whether or not the relevant EC session is under the suspend state. The I/O process moves to S32 when the relevant EC session is under the suspend state (Yes in S31). The I/O process in FIG. 14 is finished when the relevant EC session is not under the suspend state (No in S31).

(In S32) The copy control unit 14 sets to "1" the bits of the initial copy bitmap B1, which correspond to the write target regions. The I/O process in FIG. 14 is then finished.

The data reading process of S23 in FIG. 14 will be described below.

Figure 15:
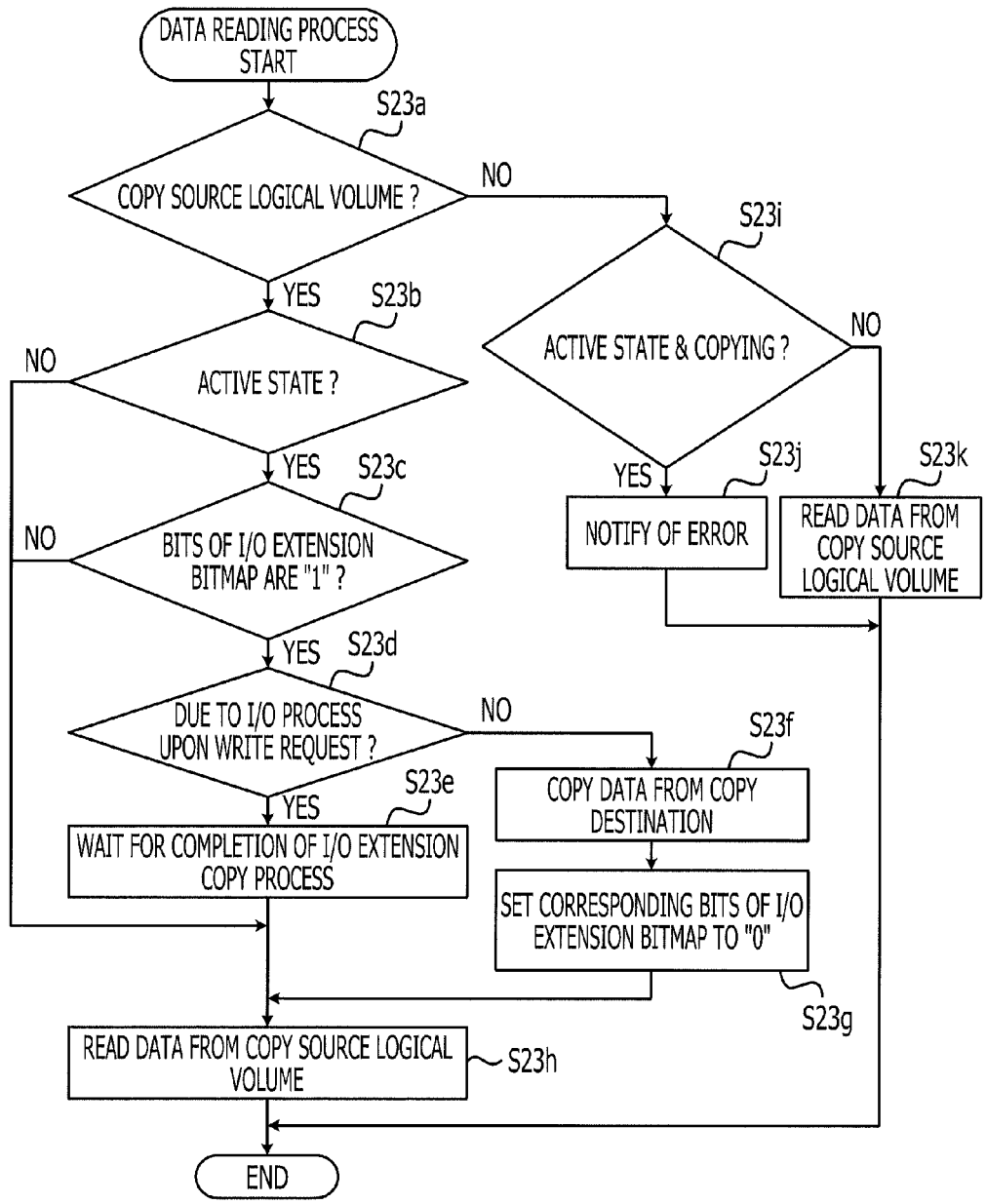
FIG. 15 is a flowchart of a data reading process.

FIG. 15 is a flowchart of the data reading process.

(In S23a) The copy control unit 14 refers to the data read source address included in the I/O request to determine whether or not the access target of the I/O request is the copy source logical volume 31. The data reading process moves to S23b when the access target of the I/O request is the copy source logical volume 31 (Yes in S23a). The data reading process moves to S23i when the access target of the I/O request is not the copy source logical volume 31 (No in S23a).

(In S23b) The copy control unit 14 refers to the state field of the session management table 12a to determine whether or not the relevant EC session is under the active state. The data reading process moves to S23c when the relevant EC session is under the active state (Yes in S23b). The data reading process moves to S23h when the relevant EC session is not under the active state (No in S23b).

(In S23c) The copy control unit 14 determines whether or not the bits of the I/O extension bitmap B2, which correspond to the read target regions specified in the I/O request, are set to "1". The data reading process moves to S23d when the bits corresponding to the read target regions are set to "1" (Yes in S23c). The data reading process moves to S23h when the bits corresponding to the read target regions are not set to "1" (No in S23c).

(In S23d) The copy control unit 14 determines whether or not the bits corresponding to the read target regions are set to "1" due to the generation of bad data. Specifically, the copy control unit 14 determines whether or not the bits corresponding to the read target regions are set to "1" due to the fact that an I/O extension copy process is being conducted. When the I/O extension copy process is not being conducted, it may be determined that the bits corresponding to the read target regions are set to "1" due to generation of bad data. The data reading process moves to S23e when the I/O extension copy process is being conducted (Yes in S23d). The data reading process moves to S23f when the I/O extension copy process is not being conducted (No in S23d).

(In S23e) The copy control unit 14 waits for the completion of the I/O extension copy process. The data reading process moves to S23h when the I/O extension copy process is completed.

(In S23f) The copy control unit 14 copies the data stored in the copy destination logical volume 32 to the read target regions of the copy source logical volume 31. The data reading process moves to S23g when the copy is completed.

(In S23g) The copy control unit 14 sets to "0" the bits of the I/O extension bitmap B2, which correspond to the read target regions. The data reading process then moves to S23h.

(In S23h) The copy control unit 14 reads the data stored in the read target regions of the copy source logical volume 31. The data reading process in FIG. 15 is finished when the data reading is completed.

(In S23i) The copy control unit 14 refers to the state field and the phase field of the session management table 12a to determine whether or not the relevant EC session is under the active state and the copy process is being conducted. The data reading process moves to S23j when the relevant EC session is under the active state and the copy process is being conducted (Yes in S23i). The data reading process moves to S23k when the relevant EC session is not under the active state or the copy process is not being conducted (No in S23i).

(In S23j) The copy control unit 14 notifies the host apparatus 50 of an error. This is because an initial copy is being executed during the relevant EC session. The data reading process in FIG. 15 is then finished.

(In S23k) The copy control unit 14 reads the data stored in the read target regions of the copy source logical volume 31. The data reading process in FIG. 15 is finished when the data reading is completed.

The data writing process in S25 in FIG. 14 will be described below.

Figure 16:
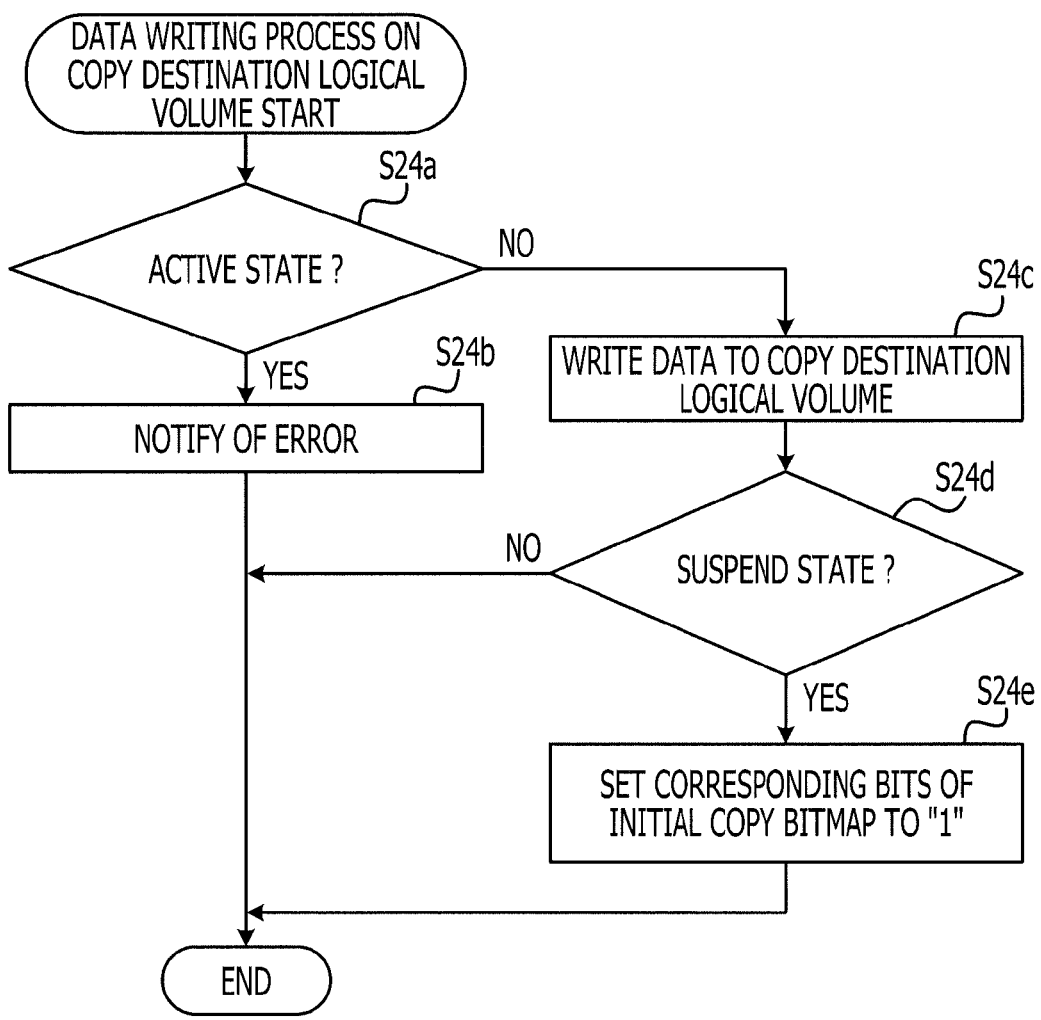
FIG. 16 is a flowchart of a data writing process.

FIG. 16 is a flowchart of the data writing process.

(In S24a) The copy control unit 14 refers to the state field of the session management table 12a to determine whether or not the relevant EC session is under the active state. The data writing process moves to S24b when the relevant EC session is under the active state (Yes in S24a). The data writing process moves to S24c when the relevant EC session is not under the active state (No in S24a).

(In S24b) The copy control unit 14 notifies the host apparatus 50 of an error. The data writing process in FIG. 16 is then finished. This is because an initial copy is being executed during the relevant EC session and thus the writing to the copy destination logical volume 32 in accordance with the I/O request is forbidden.

(In S24c) The copy control unit 14 writes, to the copy destination logical volume 32, the write target data included in the I/O request. When the writing is completed, the copy control unit 14 notifies the host apparatus 50 that the process in response to the I/O request is completed. The data reading process then moves to S24d. S24d and S24e are conducted asynchronously with the host apparatus 50.

(In S24d) The copy control unit 14 refers to the state field of the session management table 12a to determine whether or not the relevant EC session is under the suspend state. The data writing process moves to S24e when the relevant EC session is under the suspend state (Yes in S24d). The data writing process in FIG. 16 is finished when the relevant EC session is not under the suspend state (No in S24d).

(In S24e) The copy control unit 14 sets to "1" the bits of the initial copy bitmap B1, which correspond to the write target regions. The data writing process in FIG. 16 is then finished.

As described above, in the control module 10a, the copy control unit 14 refers to the initial copy bitmap B1 to check the values of the bits corresponding to the generation regions under the suspend state. The copy control unit 14 also checks the values of the bits, which correspond to the checked bits in the initial copy bitmap B1, of the I/O extension bitmap B2. The copy control unit 14 overwrites the bad data by copying the data stored in the storage regions, which correspond to the generation regions, of the copy source logical volume 31 to the generation regions when neither of the checked bits indicates the occurrence of data upgrade. Through this process, the data stored in the storage regions in which bad data is generated may be recovered.

The processes conducted by the storage apparatus 100 may be distributed among a plurality of apparatuses.

The embodiments of the control apparatus, the control method, and the storage apparatus have been described herein. However, the embodiments are not limited as such and configurations of the units may be substituted by any configuration having similar functions. Furthermore, other arbitrary constituent parts or processes may be added to the present embodiments.

The embodiments may include a combination of any two or more configurations among the abovementioned embodiments.

The abovementioned processing functions may be implemented by a computer. In this case, programs describing the processes of the functions of the control apparatus 3 or the control module 10a or 10b may be provided. The computer may execute the programs to implement the above-mentioned processing functions. The programs describing the processes may be stored in a computer-readable medium. Examples of the computer-readable medium include a magnetic storage device, an optical disk, a magneto-optic recording medium, a semiconductor memory and the like. Examples of the magnetic storage device include an HDD, a flexible disk (FD), a magnetic tape and the like. Examples of the optical disk include a digital versatile disk (DVD), a DVD-RAM, a compact disc (CD), CD-ROM, CD-ROM/rewritable (CD-ROM/RW) and the like. The magneto-optic recording medium includes a magneto-optical disk (MO) and the like.

When the programs are distributed, a portable medium, such as a DVD or a CD-ROM and the like, storing the programs may be sold, for example. Furthermore, the programs may be stored in a storage apparatus of a server computer and transferred from the server computer to another computer through a network.

The computer that executes the programs may store the programs stored in the portable medium or transferred from the server computer onto the computer's own storage device. The computer may read the programs from the storage device and implement the processing functions by executing the programs. The computer may read the programs directly from the portable medium and execute the programs to implement the processing functions according to the programs. Moreover, the computer may execute the programs one by one as being transferred from the server computer connected through the network, to implement the processing functions according to the programs.

At least a part of the abovementioned processing functions may be implemented with an electronic circuit. Examples of the electronic circuit include a digital signal processor (DSP), an application specific integrated circuit (ASIC), and a programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus for controlling data stored in a first volume of a first storage and a second volume of a second storage under one of an equivalent state and a non-equivalent state, the second storage being the same as or different from the first storage, the control apparatus comprising:
   a processor to
      determine, upon detecting a read error on the first volume under the non-equivalent state, a first storage area in which the read error has occurred, the first storage area being included in the first volume,
      determine whether a write process has been conducted on the first storage area under the non-equivalent state,
      determine whether a write process has been conducted on a second storage area under the non-equivalent state, the second storage area being included in the second volume and corresponding to the first storage area, and
      copy data stored in the second storage area to the first storage area when no write process has been conducted on the first storage area and the second storage area under the non-equivalent state.

2. The control apparatus according to claim 1, further comprising:
   a first memory to store, for each storage area in the first volume, first information indicating whether a write process has been conducted on the each storage area in the first volume; and
   a second memory to store, for each storage area in the second volume, second information indicating whether a write process has been conducted on the each storage area in the second volume,
   wherein
      the processor determines whether a write process has been conducted on the first storage area by referring to the first information stored in the first memory, and
      the processor determines whether a write process has been conducted on the second storage area by referring to the second information stored in the second memory.

3. The control apparatus according to claim 2, wherein
the processor controls equivalency of the first volume and the second volume by copying data stored in the first volume to the second volume, and
the processor merges, when shifting from the non-equivalent state to the equivalent state, the second information into the first information.

4. The control apparatus according to claim 2, wherein
the processor stores in the first memory, for each storage area in the first volume, first progress information regarding progress of a first copy process for copying data from the first volume to the second volume, and
the processor stores in the second memory, for each storage area in the first volume, second progress information regarding progress of second and later copy processes for copying data from the first volume to the second volume.

5. The control apparatus according to claim 2, wherein
the processor holds, under the equivalent state, equivalency between data stored in the first volume and the second volume by copying data stored in the first volume to the second volume,
the processor stores, under the non-equivalent state, first write information in the first memory upon receiving a first write request to write data to the first volume, the first write information indicating that a write process has been conducted on a storage area specified in the first write request, and
the processor stores, under the non-equivalent state, second write information in the second memory upon receiving a second write request to write data to the second volume, the second write information indicating that a write process has been conducted on a storage area specified in the second write request.

6. The control apparatus according to claim 2, wherein
the processor holds, under the equivalent state, equivalency between data stored in the first volume and the second volume by copying data stored in the first volume to the second volume, and
when the processor receives a read request to read data from the second volume under the non-equivalent state and when the second information corresponding to a storage area specified in the read request indicates that a write process has been conducted on the specified storage area, the processor determines whether the conducted write process has been caused due to an input or output process so that the processor copies data stored in the specified storage area to the first volume when the conducted write process has not been caused due to an input or output process.

7. A control method executed by a control apparatus for controlling data stored in a first volume of a first storage and a second volume of a second storage under one of an equivalent state and a non-equivalent state, the second storage being the same as or different from the first storage, the control method comprising:
determining, upon detecting a read error on the first volume under the non-equivalent state, a first storage area in which the read error has occurred, the first storage area being included in the first volume;
determining whether a write process has been conducted on the first storage area under the non-equivalent state;
determining whether a write process has been conducted on a second storage area under the non-equivalent state, the second storage area being included in the second volume and corresponding to the first storage area; and
copying, by the control apparatus, data stored in the second storage area to the first storage area when no write process has been conducted on the first storage area and the second storage area under the non-equivalent state.

8. A storage apparatus comprising:
a first storage having a first volume;
a second storage having a second volume, the second storage being the same as or different from the first storage; and
a control apparatus to control data stored in the first volume and the second volume under one of an equivalent state and a non-equivalent state, the control apparatus including:
a processor to
determine, upon detecting a read error on the first volume under the non-equivalent state, a first storage area in which the read error has occurred, the first storage area being included in the first volume,
determine whether a write process has been conducted on the first storage area under the non-equivalent state,
determine whether a write process has been conducted on a second storage area under the non-equivalent state, the second storage area being included in the second volume and corresponding to the first storage area, and
copy data stored in the second storage area to the first storage area when no write process has been conducted on the first storage area and the second storage area under the non-equivalent state.

* * * * *